(12) United States Patent
Takatsu et al.

(10) Patent No.: US 8,484,643 B2
(45) Date of Patent: Jul. 9, 2013

(54) CPU USAGE TIME COUNTING METHOD AND JOB CONTROL SYSTEM USING THIS CPU USAGE TIME

(75) Inventors: Susumu Takatsu, Kawasaki (JP); Katsumi Yazawa, Kawasaki (JP); Naoki Sueyasu, Kawasaki (JP); Masayuki Kogure, Kawasaki (JP); Satoki Shibayama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1606 days.

(21) Appl. No.: 11/084,142

(22) Filed: Mar. 21, 2005

(65) Prior Publication Data

US 2005/0166204 A1    Jul. 28, 2005

Related U.S. Application Data

(63) Continuation of application No. PCT/JP03/04087, filed on Mar. 31, 2003.

(51) Int. Cl.
*G06F 9/46* (2006.01)

(52) U.S. Cl.
USPC .......................................... 718/101; 718/102

(58) Field of Classification Search
None
See application file for complete search history.

(56) References Cited

U.S. PATENT DOCUMENTS

| | | | | |
|---|---|---|---|---|
| 5,440,750 | A * | 8/1995 | Kitai et al. | 712/203 |
| 5,845,310 | A | 12/1998 | Brooks | |
| 6,385,637 | B1 * | 5/2002 | Peters et al. | 718/107 |
| 6,941,379 | B1 * | 9/2005 | Dingsor et al. | 709/235 |
| 7,137,120 | B2 * | 11/2006 | Armstrong et al. | 718/107 |
| 2002/0073133 | A1 * | 6/2002 | Misaka et al. | 709/102 |
| 2002/0198924 | A1 * | 12/2002 | Akashi et al. | 709/102 |
| 2003/0084151 | A1 * | 5/2003 | Simpson et al. | 709/225 |
| 2003/0117868 | A1 * | 6/2003 | Singh | 365/200 |

FOREIGN PATENT DOCUMENTS

| | | |
|---|---|---|
| JP | 58-191045 | 11/1983 |
| JP | 63-4350 | 1/1988 |
| JP | 1-191952 | 8/1989 |
| JP | 3-127237 | 5/1991 |
| JP | 4-326434 | 11/1992 |
| JP | 5-108418 | 4/1993 |
| JP | 5-289891 | 11/1993 |
| JP | 6-95931 | 4/1994 |
| JP | 8-272627 | 10/1996 |
| JP | 11175357 A * | 12/1997 |
| WO | 95/31782 | 11/1995 |

OTHER PUBLICATIONS

Supplemental European Search Report issued Mar. 17, 2009 in corresponding European Patent Application 03715655.1.

* cited by examiner

*Primary Examiner* — Camquy Truong
(74) *Attorney, Agent, or Firm* — Staas & Halsey LLP (57) ABSTRACT

A method of counting an actual usage time of each CPU in a computer system using a plurality of computers for distributed processing of jobs comprising first counting a CPU usage time used for each job, then counting a processing wait time in memory access of each CPU whenever executing each job, subtracting the processing wait time of each CPU from the CPU usage time for every job, and setting the thus calculated corrected CPU usage time as the actual CPU usage time. A job control system has a means for realizing this method and uses the CPU usage time and the corrected CPU usage time obtained by this means to control the jobs and charge the users.

14 Claims, 10 Drawing Sheets

CPU USAGE TIME COUNTING METHOD AND JOB CONTROL SYSTEM USING THIS CPU USAGE TIME

CROSS-REFERENCE TO RELATED APPLICATIONS

This application is a continuation application of PCT/JP03/04087, filed on Mar. 31, 2003, the contents being incorporated herein by reference.

TECHNICAL FIELD

The present invention relates to a CPU usage time counting method and a job control system using this CPU usage time, more particularly relates to a method for counting an actual usage time of each CPU when having large scale application processing carried out distributed among a large number of processors (CPUs) and a job control system using this CPU usage time.

BACKGROUND ART

In general, in a large scale application using a computer or a processor and used for numerical fluid mechanics etc., the computer or processor has to have a performance exceeding several hundred GFLOPS. When realizing such a high performance, parallel processing is carried out. "Parallel processing" divides the processing among a large number of computers and processors to try to speed up the overall processing.

On the other hand, a memory configuration corresponding to the large scale application is necessary. This memory configuration may be classified into the following parallel systems.

(a) Central Memory Type

Figure 1A:
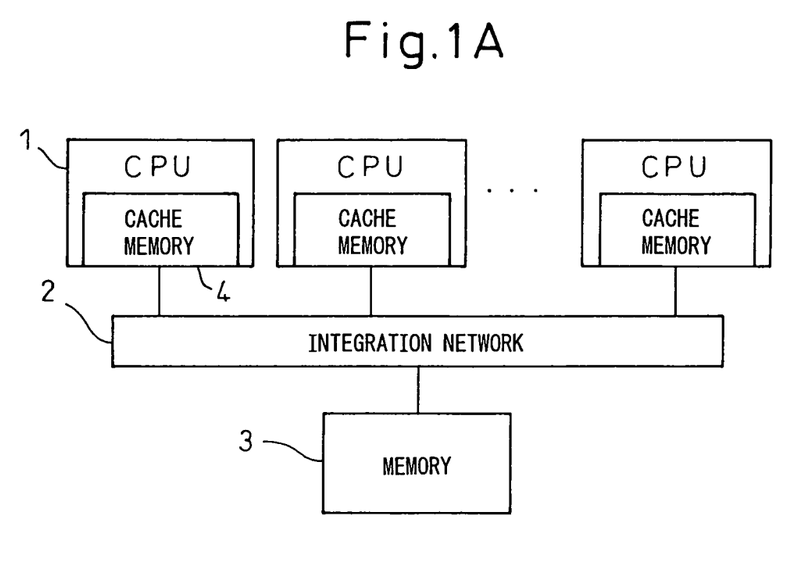
FIG. 1A is a block diagram of the configuration of a parallel processing type computer of a conventional central memory type.

This type, as shown in FIG. 1A, is configured by a plurality of processors (described as CPUs in the figure) 1 having equivalent functions and one memory space (meaning a shared memory and hereinafter simply referred to as a "memory") 3 connected to the CPUs 1 through an integration network 2. The CPUs 1 are usually provided with cache memories 4.

(B) Distributed Shared Memory Type

Figure 1B:
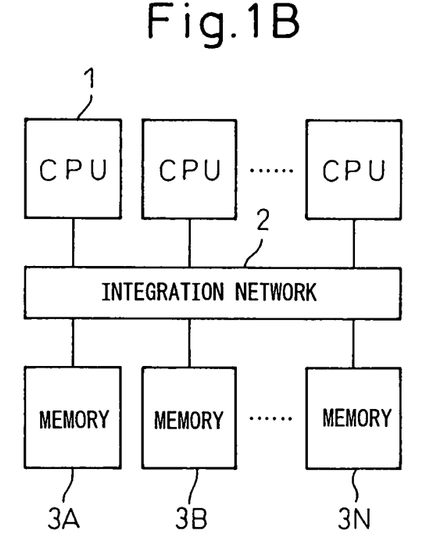
FIG. 1B is a block diagram of the configuration of a parallel processing type computer of a conventional distributed shared memory type.

This type, as shown in FIG. 1B, has the CPUs 1 connected through the integration network 2 to dispersed local memories 3A to 3N (A to N are any natural numbers). The local memories 3A to 3N can be logically accessed as shared memory. In this example, illustration of the cache memories in the CPUs 1 is omitted.

(C) Distributed Memory Type

Figure 1C:
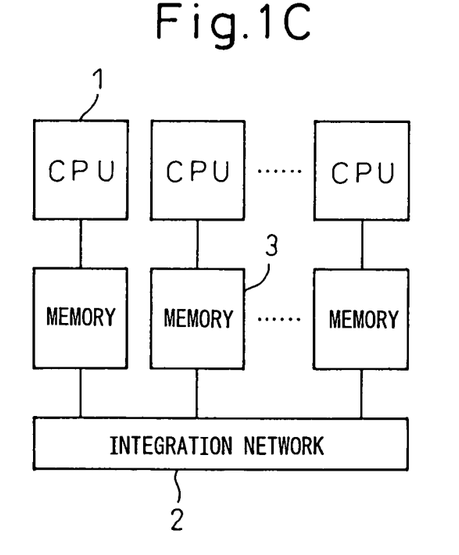
FIG. 1C is a block diagram of the configuration of a parallel processing type computer of a conventional distributed memory type.

This type, as shown in FIG. 1C, has a plurality of system elements 4 comprising CPUs 1 and memories 3 integrated by an integration network 2. Access to the data in the memories 3 of the different system elements 4 is realized by communication through the integration network 2. In this example as well, illustration of the cache memories in the CPUs 1 is omitted.

Figure 2:
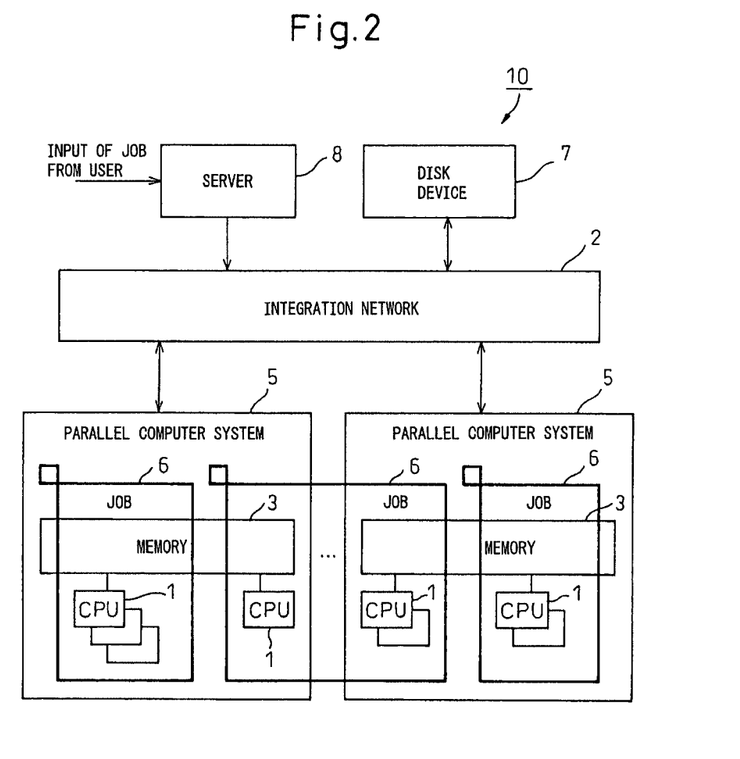
FIG. 2 is a diagram explaining a job execution environment in a distributed parallel computer system to which a CPU usage time counting method of the present invention is applied.

As explained above, high end computers (distributed parallel computer systems) 10 in the field of science and technology are configured by large numbers of CPUs (tens to thousands of CPUs) and giant memories (logical/physical). FIG. 2 shows an example of a job execution environment in such a high end computer. In a high end computer, a plurality of parallel computer systems 5 are connected in parallel by an integration network 2. Each parallel computer system 5 includes a CPU 1 and a memory 3. Further, the integration network 5 has a disk device 7 such as a hard disk device, a magnetic disk device, or an optical disk device connected to it. The actual data, programs, etc. are stored in this disk device 7.

When a server 8 of the high end computer 10 is given a job from a user, the server 8 determines the parallel computer system 6 to be made to execute the job. This job 6 is sometimes carried out in one parallel computer system 5 and sometimes executed over a plurality of parallel computer systems 5. In this way, a high end computer 10 is an environment wherein a variety of large or small jobs are executed mixed together.

In such a job execution environment, operating technology is sought which enables the resources (CPUs and memories) of the large scale system to be efficiently made effective use of (high system operating rate) and realizes stable service to end users (jobs) (job execution time guarantee, low fluctuation execution time, and fine job control function).

In a conventional environment where a plurality of jobs operate in a computer system, in order to process a certain job in the set time, the practice has been to predict an ending time from an amount of processing of the job at the present point of time and control this job with priority over other jobs so as to bring the predicted end timing of this job close to the desired end timing. Further, when predicting the ending time of a certain job, the method has been adopted of predicting the ending time by taking into consideration fluctuation of the load of the computer system such as the amount of input/output amount of data in addition to the usage times of the CPUs (see for example Japanese Unexamined Patent Publication (Kokai) No. 5-265775).

Further, the usage time of a CPU expresses the performance in the case of ideal execution alone, so when predicting the performance of a CPU in an environment wherein a plurality of jobs are executed, the practice has been to add the actual CPU usage time (charged time) of the job and the time during which the CPU was used for jobs not to be added to the charged time so as to find and predict the total CPU usage time for each job (see for example Japanese Unexamined Patent Publication (Kokai) No. 5-289891). This prediction method was a method of predicting the performance of a CPU in an environment where a plurality of jobs are executed from the total CPU usage time obtained by adding the usage time of the CPU used for services carried out by a system demon for executing a job to the CPU usage time for the job.

In the technologies described in Japanese Unexamined Patent Publication (Kokai) No. 5-265775 and Japanese Unexamined Patent Publication (Kokai) No. 5-289891, however, in all cases, the CPU usage time for a job itself was considered constant (ideal) under all environments, therefore, deviation occurred in the prediction in a case of predicting the ending time of a certain job or a case of predicting the performance of a CPU in an environment where a plurality of jobs are executed. A cause of occurrence of this prediction deviation will be explained below.

In principle, when executing the same program a plurality of times or when simultaneously executing a plurality of jobs, the time from the start of execution of the processing to the end is regarded as the "elapsed time fluctuating every time" or "the usage time of the CPU constant every time". However, the CPU usage time becoming constant every time is true only in an ideal computer. In an actual computer, the memory access performance is not constant every time, so the CPU usage time will fluctuate every time.

For example, when a CPU has a cache memory, a difference arises in the reading time of the data and therefore the memory access performance ends up becoming different depending on whether the data to be read out next exists in this cache memory (the cache is hit) or the data to be read out does not exist in the cache memory, but is to be newly read out from a shared memory etc. (cache missed). Further, in the case of a computer system having a plurality of system boards, for a job to be processed from then on, the memory access performance of the CPU ends up differing between a case where the CPU and memory accessed by it are arranged on the same system board and a case where the CPU and the memory accessed by it are arranged on different system boards. Further, when a plurality of jobs or parallel jobs are being executed by sharing a memory, the memory access wait time due to memory competition for a certain job fluctuates depending upon the state of the memory access load for every job, so the CPU usage time will dynamically fluctuate every time.

In this way, in the prior art, unless the CPU usage time of the job itself is ideal, the CPU usage time will fluctuate every time. When predicting the ending time of a certain job or when predicting the performance of a CPU in an environment wherein a plurality of jobs are executed, there were therefore the problem of deviation occurring in the prediction and the problem that the CPU usage time was not correctly charged.

DISCLOSURE OF THE INVENTION

Accordingly, in order to solve these problems, an object of the present invention is to provide a CPU usage time counting method able to correct for differences of the CPU usage time due to the different memory access performance for every execution of a job explained above and thereby compute the actual CPU usage time as a corrected CPU time, able to find the same corrected CPU usage time every time by processing when processing the same program, able to correctly predict the ending time of a certain job, able to predict the performance of a CPU in an environment where a plurality of jobs are executed, and able to provide stable service even for charging for the CPU usage time, and a job control system using this CPU usage time.

The CPU usage time counting method of the present invention for achieving the above object is a method for counting an actual usage time of each CPU in a computer system using a plurality of computers for distributed processing of jobs, characterized by counting a CPU usage time used for each job, counting a processing wait time in memory access of each CPU whenever executing a job, and setting a corrected CPU usage time, calculated by subtracting a processing wait time in the memory access of each CPU from the CPU usage time for each job, as an actual CPU usage time.

This CPU usage time is the time acquired by a function provided in basic software of the computer system for counting the time used by the corresponding job, while the processing wait time of a CPU is the time obtained by subtracting from the memory access time of the corresponding job calculated by using a hardware monitor for counting a memory access performance value the memory access time of the corresponding job at the highest speed in the hardware design of the computer system.

Further, it is also possible to compare the calculated corrected CPU time with a CPU usage time limit and end the job when the corrected CPU usage time becomes the CPU usage time limit or more.

Further, it is also possible to output the corrected CPU usage time for display and recordal upon request from the job.

On the other hand, a job control system using the CPU usage time of the present invention for achieving the above object is a job control system counting an actual usage time of each CPU in a computer system using a plurality of computers for distributed processing of jobs and controlling the jobs according to the actual usage time, characterized by being provided with a counting means for counting a processing wait time due to the memory access wait of each CPU whenever executing a job, a corrected CPU usage time calculating means for subtracting the processing wait time due to the memory access wait of each CPU from each CPU usage time for every job to thereby calculate the corrected CPU usage time, and a job controlling means for using the corrected CPU usage time to control a job.

According to the CPU usage time counting method of the present invention and the job control system using this CPU usage time, it is possible to compute the actual CPU usage time and thereby find the same corrected CPU usage time every time by processing when processing the same program, correctly predict the ending time of a certain job, predict the performance of a CPU in an environment where a plurality of jobs are executed, and provide stable service even for charging for the CPU usage time.

BRIEF DESCRIPTION OF THE DRAWINGS

The above objects, features, advantages, etc. of the present invention will be explained in detail below according to the accompanying drawings. The content of the accompanying drawings is as follows.

BEST MODE FOR WORKING THE INVENTION

Below, best modes for working the invention will be explained based on the accompanying drawings. Members having the same configurations as those of the members explained in FIG. 1A to FIG. 2 will be explained assigned the same notations.

Figure 3A:
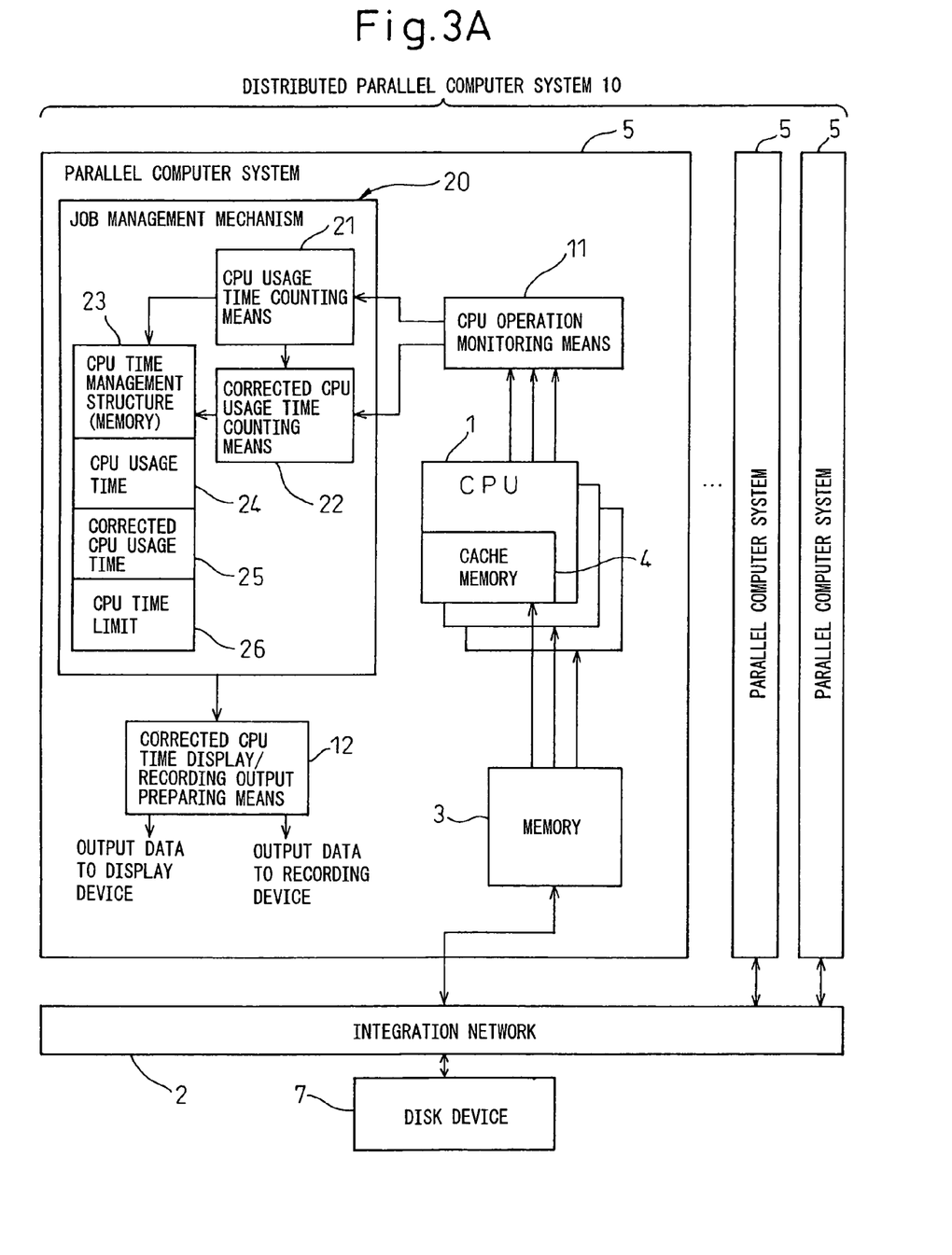
FIG. 3A is a block diagram of an example of the configuration of a distributed parallel computer system to which the CPU usage time counting method of the present invention is applied.

FIG. 3A is a block diagram of an example of the configuration of a distributed parallel computer system 10 to which a CPU usage time counting method of the present invention is applied. In the distributed parallel computer system 10, a plurality of parallel computer systems 5 are connected through an integration network 2. This integration network 2 generally has a disk device 7 such as a hard disk device able to hold the data and programs even if power is turned off connected to it.

The configuration of each parallel computer system 5 is the same, so the internal configuration of only one parallel computer system 5 among them is shown in FIG. 3A. The parallel computer system 5 is provided in parallel with a plurality of CPUs 1 each provided with a cache memory 4. These plurality of CPUs 1 are connected to a memory (shared memory) 3 connected to the integration network 2. Each CPU 1 fetches data stored in the memory 3 into its cache memory 4 for processing.

Each CPU 1 is monitored in its operation by a CPU operation monitoring means (hardware monitor) 11. Further, the parallel computer system 5 is provided with a job management mechanism 20 including a CPU usage time counting means 21, a corrected CPU usage time counting means 22, and a CPU time management structure (memory) 23. This CPU time management structure 23 includes an area 24 for storing the CPU usage time, an area 25 for storing the corrected CPU usage time, and an area 26 for storing the limit of the usage time of the CPU (described as the CPU time limit in the figure). The limit of the usage time of CPU is set by each user. Further, this CPU time management structure 23 can be provided using part of the memory 3 as well.

The CPU usage time counting means 21 counts the usage time of each CPU (including the processing wait time due to memory access) by accessing the CPU operation monitoring means 11 and stores this counted value in the CPU usage time storage area 24 of the CPU time management structure 23. The corrected CPU usage time counting means 22 counts the processing wait time due to memory access of each CPU by accessing the CPU operation monitoring means 11, subtracts the processing wait time of each CPU explained above from the usage time of each CPU counted at the CPU usage time counting means 21, and thereby calculates the corrected CPU usage time of actual operation by each CPU 1 for the processing. The corrected CPU usage time counting means 22 stores the calculated corrected CPU usage time in the corrected CPU usage time storage area 25 of the CPU time management structure 23.

Further, the job management mechanism 20 has a corrected CPU time display/recording output preparing means 12 connected to. The corrected CPU time display/recording output preparing means 12 outputs the data of the corrected CPU usage time stored in the corrected CPU usage time storage area 25 of the CPU time management structure 23 to a not illustrated display device and recording device.

Figure 3B:
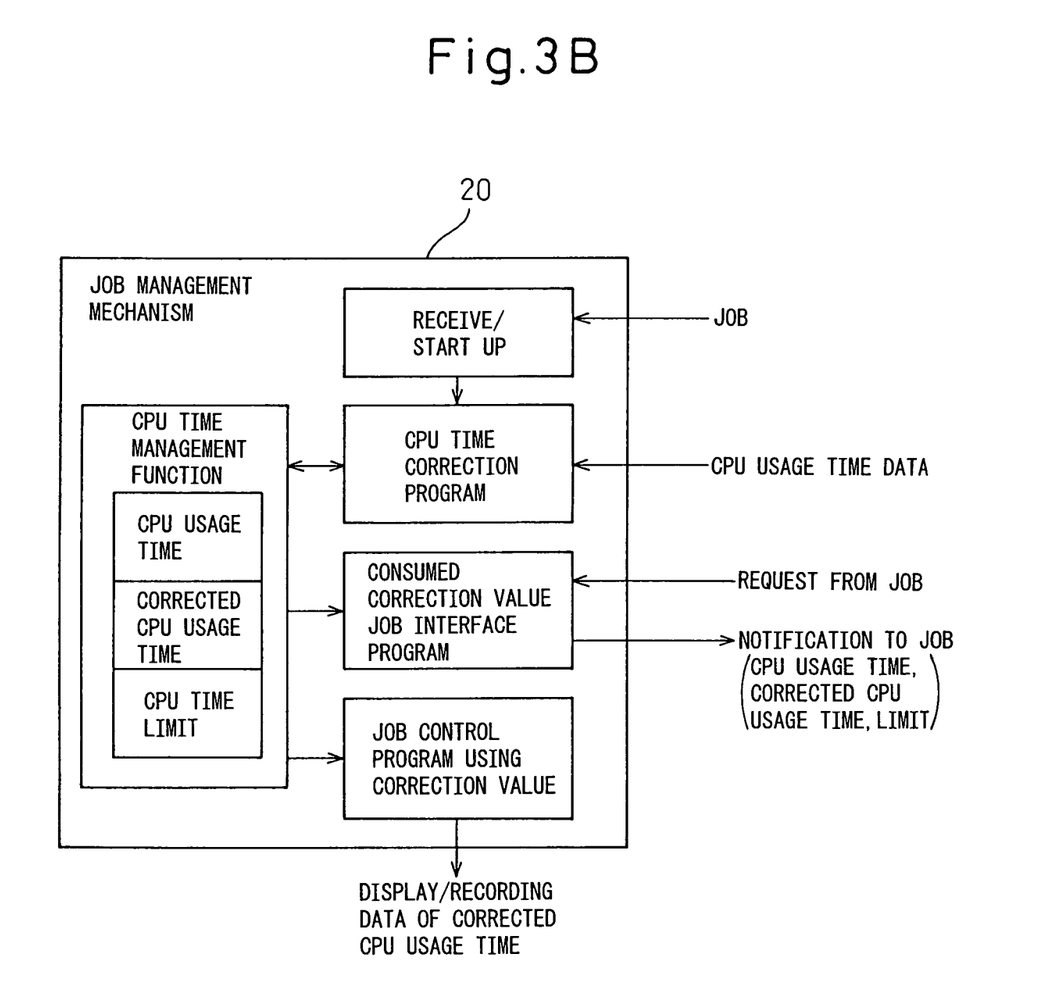
FIG. 3B is a block diagram for explaining functions of a job management mechanism of FIG. 3A.

FIG. 3B is a block diagram for explaining the functions of the job management mechanism 20 of FIG. 3A. The job management mechanism 20 has a function of accepting one job and starting up and executing the job, a function of using CPU usage time data input from a CPU time correction program to calculate an actual CPU usage time, a function of using a job interface program of a consumption correction value to notify present data such as the CPU usage time, the corrected CPU usage time, and the CPU time limit to the job when there is a request from the job, a function of outputting the display/recording data of the corrected CPU usage time according to the job control program using the corrected value, and other functions. Further, the data of the CPU usage time, the corrected CPU usage time, and the CPU time limit can be managed according to software by the CPU time management function.

Here, the principle of the CPU usage time counting method of the present invention will be explained. In general, in a computer system using a plurality of computer systems for distributed processing, due to competition for computer resources such as memory competition and the arrangement of the jobs, a different processing wait time (memory access time) occurs in each CPU for every execution of a job. Accordingly, in the computer systems for distributed processing up to now, the same CPU usage time could not be obtained every time even if executing the same program due to length of this processing wait time of the CPU.

Therefore, the CPU usage time counting method of the present invention corrects deviation occurring in the CPU usage time due to this wait time of the CPU and calculates the corrected CPU usage time, which becomes the same CPU usage time every time in the case of the same program.

This corrected CPU usage time can be found by the following processing.

Corrected CPU usage time=CPU usage time−processing wait time of CPU different for every execution As a specific method for correcting fluctuation of the memory access time due to the processing wait time of a CPU differing for every execution, it is possible to combine the following functions generally mounted in the hardware of the computer system and the operating system (OS).

(1) Function of counting the memory access time including the processing wait time of the CPU for a corresponding job using a hardware monitor for counting the memory access performance value;

(2) Function of counting the memory access time for a corresponding job not including the processing wait time of CPU of the highest speed in the hardware design of the computer; and (3) CPU usage time generally acquired as a charged value acquired by the function of counting the CPU usage time used by the corresponding job provided in the OS.

Then, by combining the functions of (1) to (3), the corrected CPU usage time can be calculated by the following equation.

$$\text{Corrected CPU usage time}=(3)-((1)-(2))$$

The corrected CPU usage time found by this calculation is a constant CPU usage time with respect to a certain job corrected for the processing wait time in memory access even when the memory access time of the CPU fluctuates. Even when the same program is executed a plurality of times under a variety of situations, the same corrected CPU usage time can be calculated every time.

Figure 4:
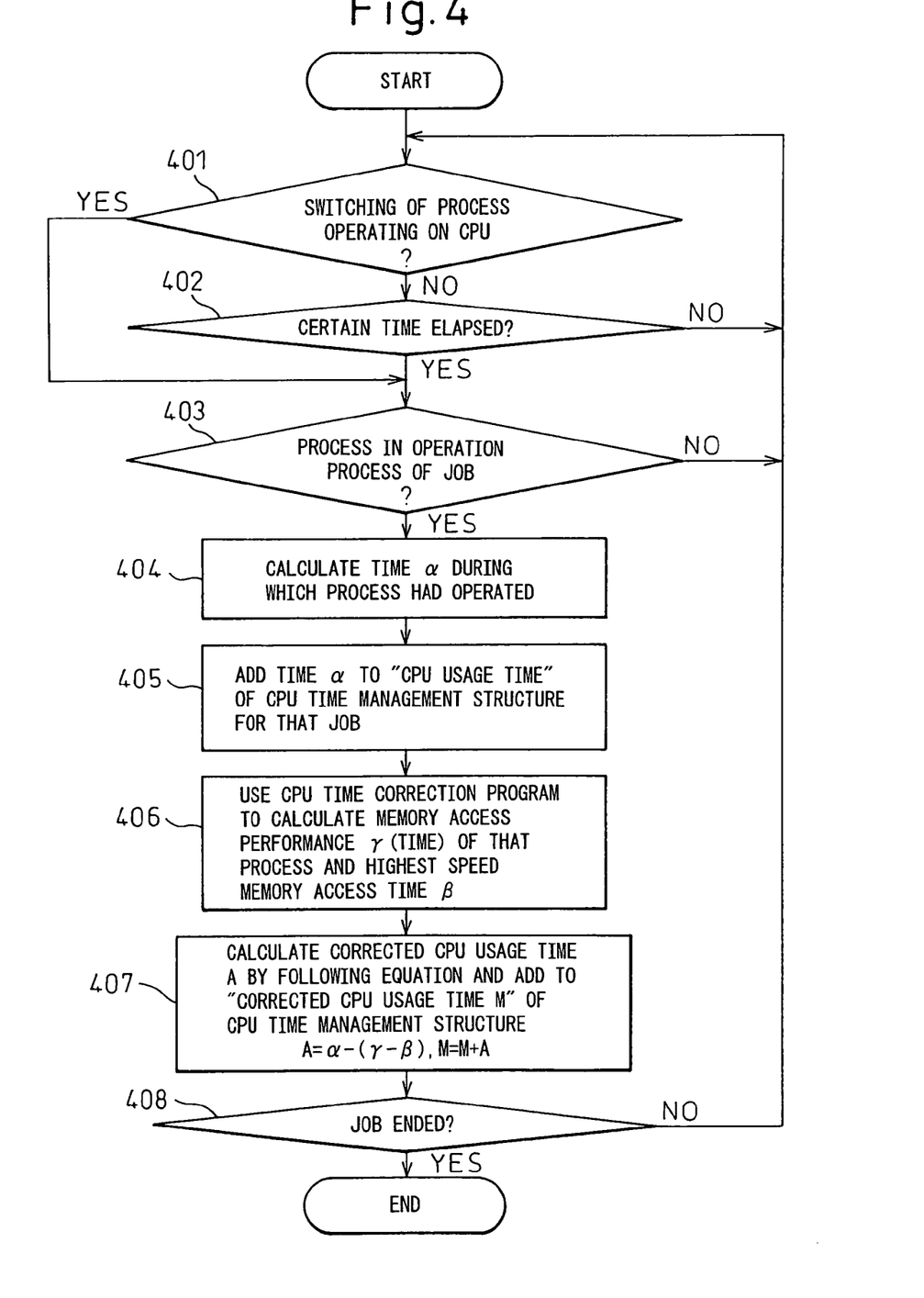
FIG. 4 is a flowchart for explaining a first embodiment of a CPU usage time count operation of the job management mechanism shown in FIG. 3A.

Here, a first embodiment of the CPU usage time count operation for calculating this corrected CPU usage time according to the job management mechanism 20 shown in FIG. 3A will be explained by using the flowchart shown in FIG. 4. This CPU usage time count operation is started up at the time of execution of a job.

At step 401, it is judged whether or not a process operating on the CPU had been switched. The "process" is the minimum unit of execution of a job. When a switch occurred, the routine proceeds to step 403, while when no switch occurred, the routine proceeds to step 402, where it is judged whether or not a constant time has elapsed after shifting to this process. When the constant time has elapsed, the routine proceeds to step 403, while when the constant time has not elapsed, the routine returns to step 401. The case where it is judged at step 401 that the constant time has elapsed is the case where the job exceeds the limit before the switching of the process.

When the routine proceeds to step 403 in this way, it is judged at step 403 whether or not the process in operation at present is a process of a job. Processes include system service etc. other than processes of jobs. If the process in operation is not a process of a job, the routine returns to step 401, while when the process in operation is a process of a job, it is a process covered by the job management mechanism 20 explained in FIG. 3A, so the routine proceeds to step 404.

At step 404, a time α during which this process had been operated is calculated. The time α during which this process had been operated means the time from when this process starts operating on the CPU to when it is switched to another process operating on this CPU. Accordingly, this time α includes the processing wait time of the CPU. After the time α is calculated, the control proceeds to step 405, where this calculated time a is added to the CPU usage time storage area (simply described as the "CPU usage time" in FIG. 4) 24 of the CPU time management structure 23 of the corresponding job. The operation up to here is the process for calculating the usage time of a CPU in a conventional computer system.

After adding this calculated time α to the CPU usage time storage area 24 of the CPU time management structure 23 of the corresponding job in this way, at the subsequent step 406, the CPU time correction program explained in FIG. 3B calculates a memory access performance γ of the corresponding process, that is, a memory access time γ including the processing wait time of the CPU of the corresponding job, and a memory access time β of the highest speed in the computer system. This "memory access time β of the highest speed" means the memory access time when there is no processing wait time in the CPU.

At the subsequent step 407, a corrected CPU usage time A is calculated by the equation $A=\alpha-(\gamma-\beta)$, and this calculated A is added to a time M stored in the corrected CPU usage time storage area 24 of the CPU time management structure 23 (described as a "usage time M" in FIG. 4) (M=M+A). Then, at the next step 408, it is judged whether or not the job has ended. When the job has not ended, the routine returns to step 401, while when the job has ended, this routine is ended.

By the processing described above, the CPU time management structure 23 shown in FIG. 3A stores a time the same as the usage time of a conventional CPU in the CPU usage time storage area 24 and stores a corrected true CPU usage time in the corrected CPU usage time storage area 25 as the corrected CPU usage time.

Figure 5:
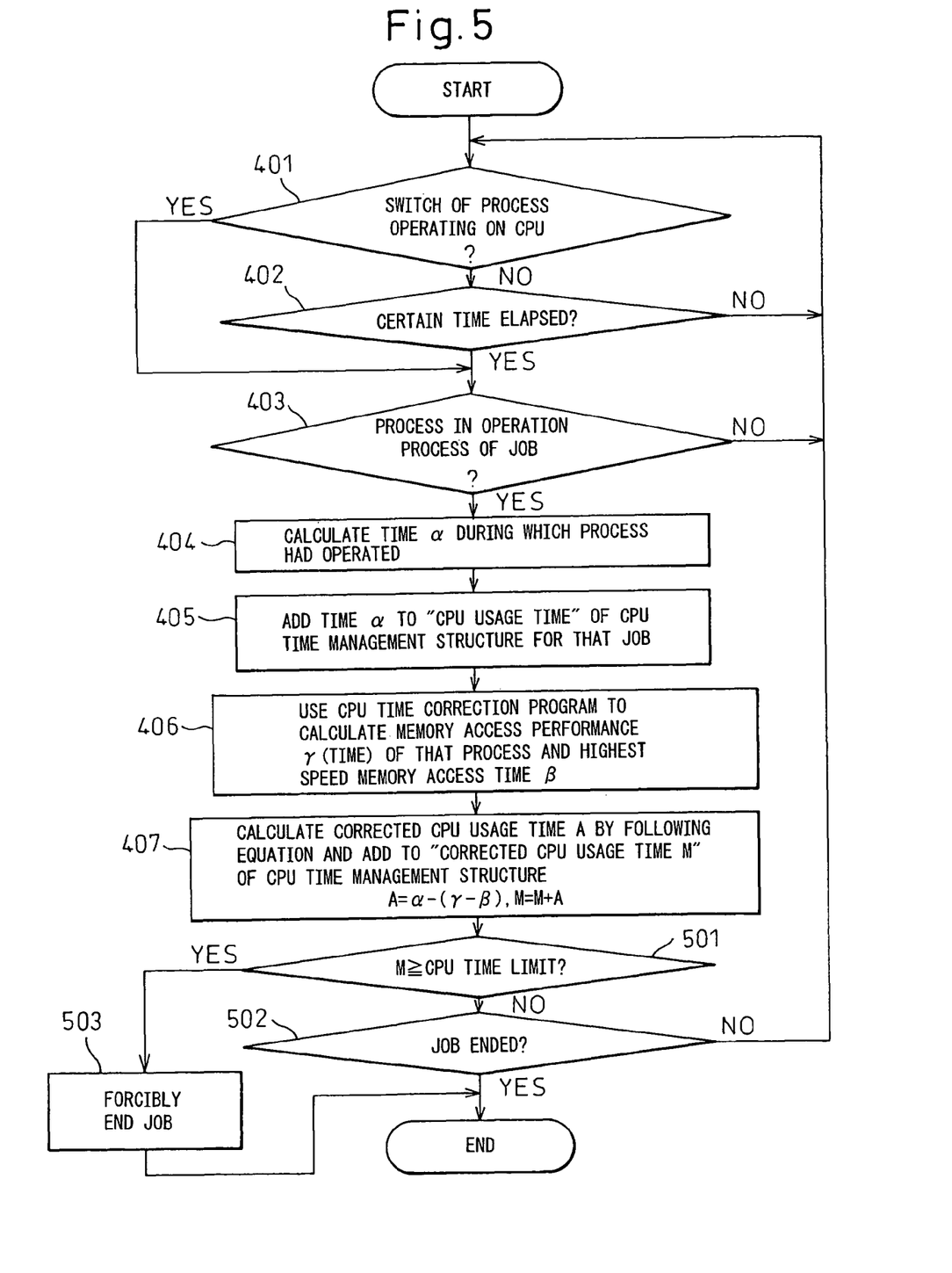
FIG. 5 is a flowchart for explaining a second embodiment of the CPU usage time count operation of the job management mechanism shown in FIG. 3.

FIG. 5 is a flowchart of a second embodiment of the CPU usage time count operation for calculating this corrected CPU usage time according to the job management mechanism 20 shown in FIG. 3A. This is a modification of the CPU usage time count operation explained in FIG. 4. The difference of the CPU usage time count operation shown in FIG. 5 from the CPU usage time count operation explained in FIG. 4 resides in only the processing after step 407. Accordingly, the explanation of the processing from step 401 to step 407 will be omitted, and only portions different from the flowchart explained in FIG. 4 will be explained.

As explained above, in the first embodiment, at step 407, the corrected CPU usage time A was calculated by $A=\alpha-(\gamma-\beta)$, and this calculated time A was added to the time M (described as the "corrected CPU usage time" in FIG. 4) stored in the corrected CPU usage time storage area 24 of the CPU time management structure 23 (M=M+A). In the second embodiment, at the next step 501, it is judged whether or not the time M stored in the storage area 24 of the corrected CPU usage time of the CPU time management structure 23 becomes more than the limit stored in the CPU usage time limit storage area (described as the "CPU time limit" in the figure) 26 of the CPU time management structure 23. This limit is set by the user.

Then, when the judgment of step 501 is (M≧CPU time limit), the routine proceeds to step 503, where the job is forcibly ended, then this routine is ended. On the other hand, when the judgment of step 501 is (M<CPU time limit), the routine proceeds to step 502, where it is judged whether or not the job has ended. When the job has not ended, the routine returns to step 401, while when the job has ended, this routine is ended.

In this way, in the second embodiment, when the added value M of the corrected CPU usage time A becomes the limit of the CPU usage time or more, the job is forcibly ended. This operation for forcibly ending the job is an operation of the job control system using the corrected CPU usage time.

Figure 6:
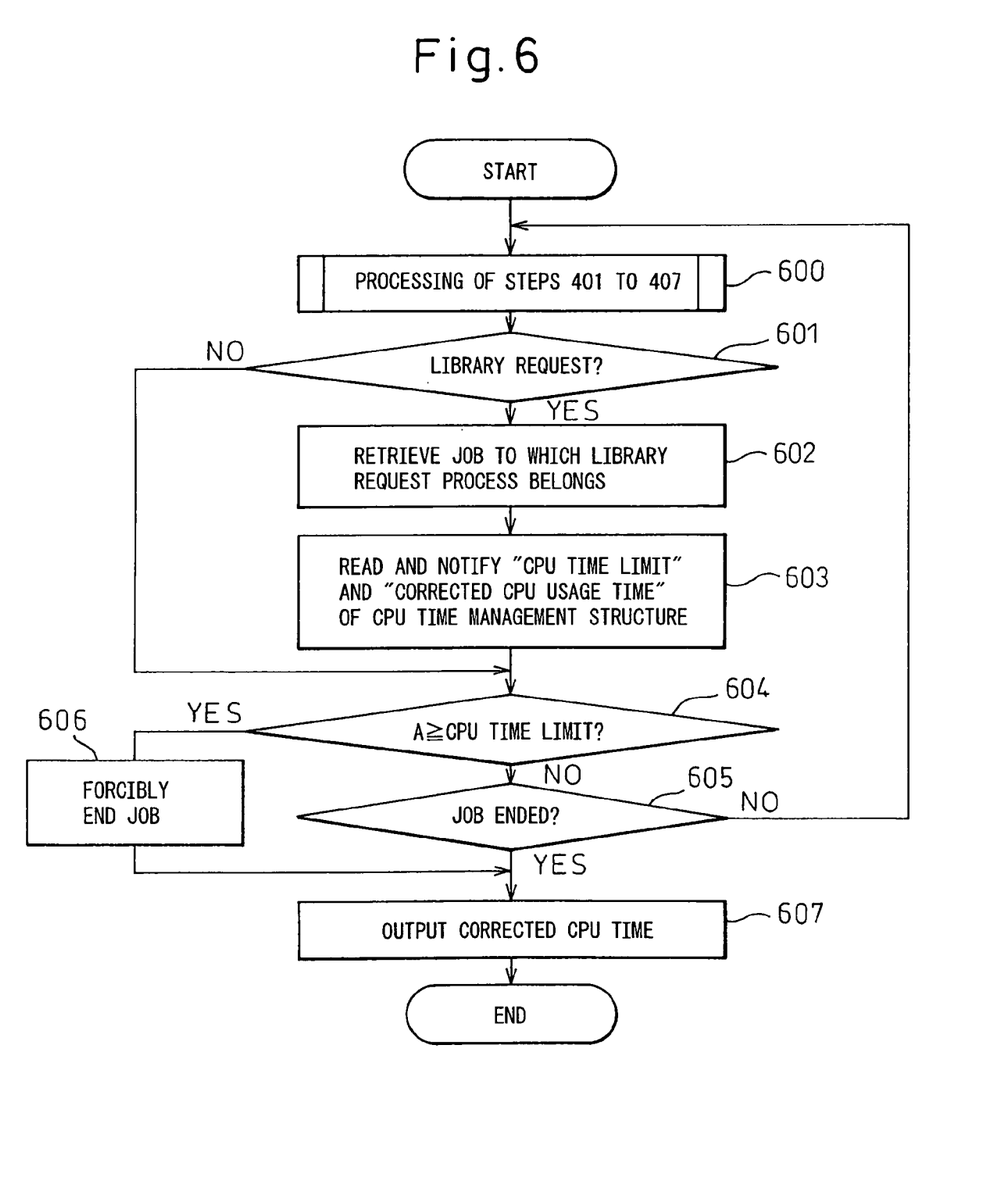
FIG. 6 is a flowchart for explaining a third embodiment of the CPU usage time count operation of the job management mechanism shown in FIG. 3.

FIG. 6 is a flowchart of a third embodiment of the CPU usage time count operation for calculating this corrected CPU usage time according to the job management mechanism 20 shown in FIG. 3A. This is a modification of the CPU usage time count operation explained in FIG. 5. The difference of the CPU usage time count operation shown in FIG. 6 from the CPU usage time count operation explained in FIG. 5 resides in only the processing after step 407. Accordingly, the processing from step 401 to step 407 are combined as step 600, the explanation thereof is omitted, and only the portions different from the flowchart explained in FIG. 5 will be explained.

The third embodiment shows the operation when there is a request for notification of the intermediate result of the corrected CPU usage time from a job in the count operation of the corrected CPU usage time or a request for notification of the corrected CPU usage time in the previous job. In the third embodiment, during the count operation of this corrected CPU usage time, the request for notification of the intermediate result of the corrected CPU usage time from a job or the request for notification of the corrected CPU usage time in the previous job is described as a "library request". At step 601 after step 407, it is judged whether or not this library request has occurred.

The "library request" is a request for notification of the intermediate result of the calculation in the computer system from a user or a job. Usually, the calculation processing with respect to one job does not end by one calculation processing of the computer system. In such a case, the calculation is carried out divided into several parts. In such a case, the library request enables the time when the calculations will end to be learned in advance and the intermediate result to be learned, so this is convenient for the user.

When there is no library request, the routine proceeds to step 604, then the processing from step 604 to step 605 corresponding to the processing from step 501 to step 503 in the second embodiment is executed. At step 607, the corrected CPU usage time (described as the "corrected CPU time" in the figure) is output, then this routine is ended. This corrected CPU usage time may also be output last in the above first and second embodiments as well.

On the other hand, when it is judged at step 601 that there is a library request, the routine proceeds to step 602. At step 602, a job to which the library execution process belongs is retrieved, while at the subsequent step 603, the CPU time limit of the corresponding job of the CPU time management structure 23 and the corrected CPU usage time are read out and notified to the job, then the routine proceeds to step 604. The processing after step 604 is as previously explained.

Figure 7:
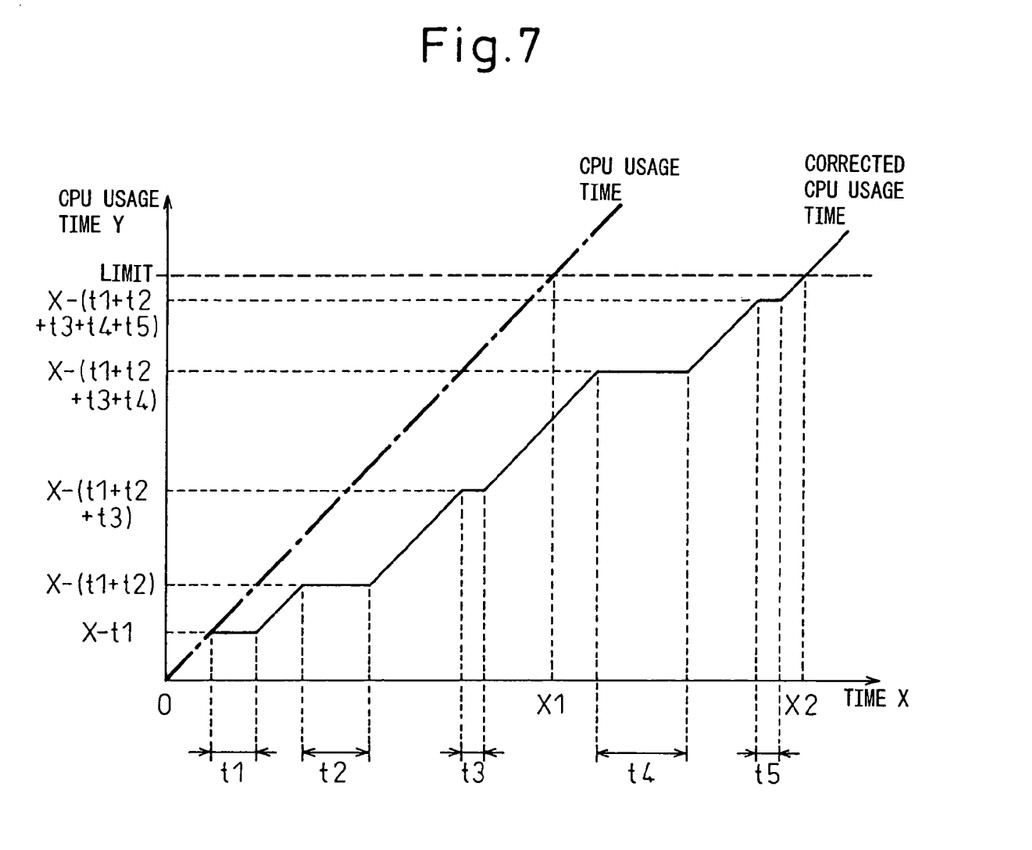
FIG. 7 is a graph showing a comparison of a corrected CPU usage time according to the method of the present invention and the CPU usage time according to a conventional method.

FIG. 7 is a graph showing a comparison of the corrected CPU usage time according to the CPU usage time counting method of the present invention and the CPU usage time according to the conventional method. In the conventional method, a CPU usage time Y has a one-to-one correspondence with the elapse of a time X as indicated by the dot-chain line and reaches the limit of the CPU usage time indicated by a broken line at a time X1. Contrary to this, in the CPU usage time counting method of the present invention, the processing wait times (memory access wait times) of the CPU indicated by the times t1, t2, t3, t4, and t5 are not counted in the corrected CPU usage time. Accordingly, according to the method of the present invention, the CPU usage time reaches the limit of the CPU usage time indicated by the broken line at a time X2 later than the time X1, so a greater amount of processing can be executed with respect to the limit.

Figure 8:
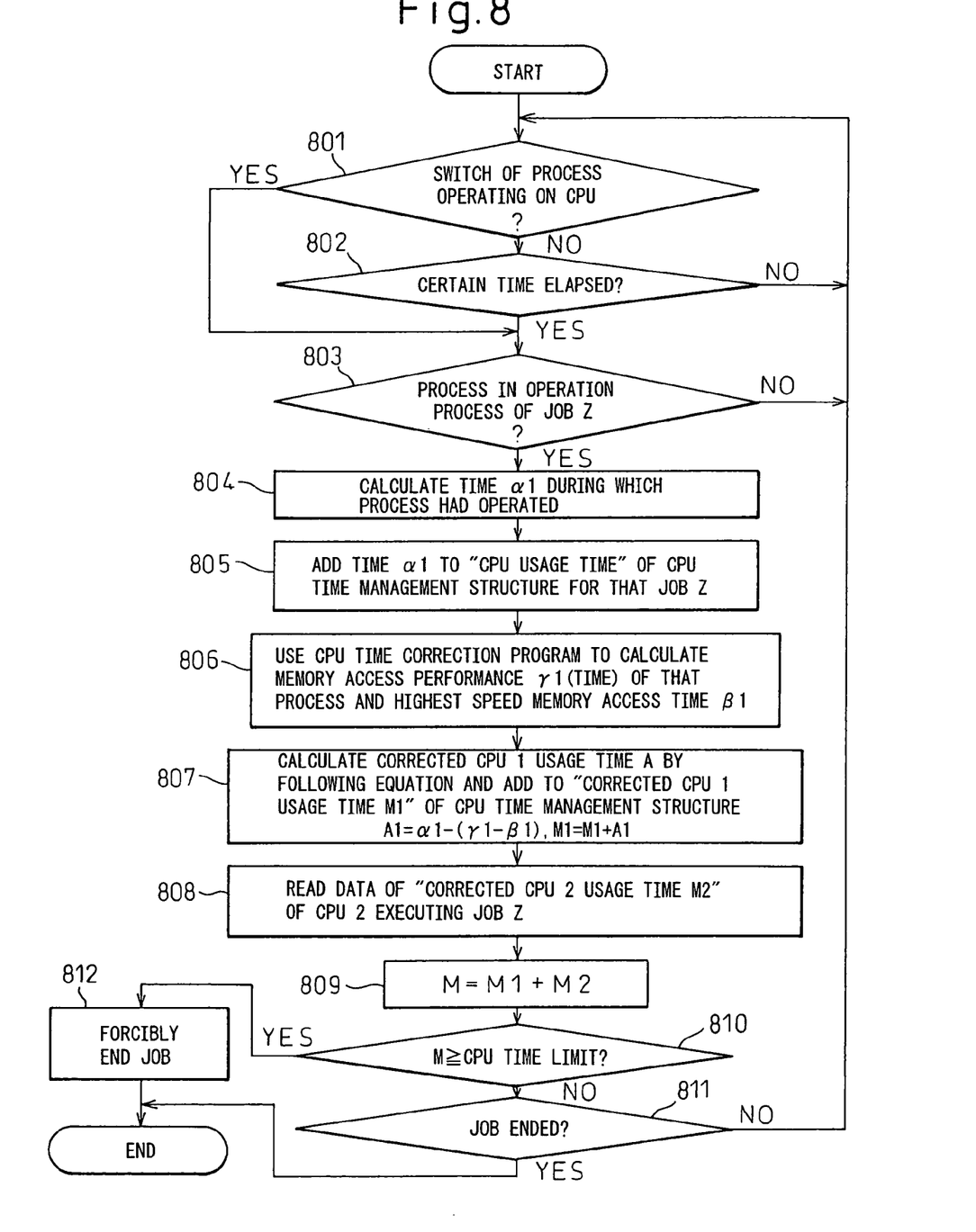
FIG. 8 is a flowchart for explaining a fourth embodiment of the CPU usage time count operation of the job management mechanism when one job is carried out by two CPUs.

The above explained embodiment was the method of calculation of the corrected CPU usage time when using one CPU to perform the calculations for one job. FIG. 8 is a flowchart for explaining a fourth embodiment of the present invention for explaining the CPU usage time count operation of the job management mechanism of the CPU 1 when two CPUs, that is, the CPU 1 and the CPU 2, carry out one job.

At step 801, it is judged whether or not the process operating on the CPU 1 was switched. When a switch occurred, the routine proceeds to step 803, while when no switch occurred, the routine proceeds to step 802, where it is judged whether or not a constant time has elapses after the shift to this process. When the constant time has elapsed, the routine proceeds to step 803, while when the constant time has not elapsed, the routine returns to step 801. The case where it is judged at step 802 that the constant time has elapsed is the case where the job exceeds the limit before the process switches.

When the routine proceeds to step 803 in this way, at step 803, it is judged whether or not the process in operation at present is a process of a job Z. When the process in operation is not a process of the job Z, the routine returns to step 801, while when the process in operation is a process of the job Z, the routine proceeds to step 804. At step 804, a time $\alpha 1$ during which the process had been operating is calculated. After the time $\alpha 1$ is calculated, the routine proceeds to step 805, where this calculated time $\alpha 1$ is added to the CPU1 usage time storage area of the CPU1 time management structure of the corresponding job Z.

After adding this calculated time $\alpha 1$ to the CPU1 usage time storage area of the CPU1 time management structure of the corresponding job Z in this way, at the subsequent step 806, the CPU time correction program explained in FIG. 3B calculates the memory access performance $\gamma 1$ of the corresponding process, that is, the memory access time $\gamma 1$ including the processing wait time (memory access wait time) of the CPU 1 of the corresponding job Z, and the memory access time $\beta 1$ of the highest speed in the computer system. This "memory access time $\beta 1$ of the highest speed" means the memory access time when there is no processing wait time (memory access wait time) in the CPU 1.

At the subsequent step 807, the corrected CPU1 usage time A1 is calculated by $A1=\alpha 1-(\gamma 1-\beta 1)$, and this calculated time A1 is added to a time M1 stored in the corrected CPU1 usage time storage area (M1=M1+A1).

The processing from step 801 to step 807 is also executed in the job management mechanism of the other CPU 2. Namely, the CPU2 time management structure of the CPU2 calculates the corrected CPU2 usage time A2 with respect to this job Z by $A2=\alpha 2-(\gamma 2-\beta 2)$ and addes this calculated time A2 to a time M2 stored in the corrected CPU2 usage time storage area of the CPU2 time management structure (M2=M2+A2).

Therefore, at step 808, the data of the corrected CPU2 usage time M2 of the CPU 2 executing the job Z is read. Then, at the next step 809, the corrected CPU1 usage time M1 of the CPU 1 and the corrected CPU2 usage time M2 of the CPU 2 are added to calculate the corrected CPU usage time M of the sum of the CPU 1 and the CPU 2. The corrected CPU usage time M of the sum of the CPU 1 and the CPU 2 is stored in for example the corrected CPU usage time storage area of the CPU 1.

Then, at the next step 810, it is judged whether or not the time M stored in the corrected CPU usage time storage area of the CPU time management structure becomes the limit of the CPU usage time of the CPU time management structure or more in the same way as above. When the judgment of step 810 is (M≧CPU time limit), the routine proceeds to step 812, where the job Z is forcibly ended, then this routine is ended. On the other hand, when the judgment of step 810 is (M<CPU time limit), the routine proceeds to step 811, where it is judged whether or not the job Z has ended. When the job Z has not ended, the routine returns to step 801, while when the job has ended, this routine is ended.

The processing explained above in FIG. 8 is the processing when a job Z is processed distributed to two CPUs of the CPU 1 and the CPU 2, but the same applies to the procedure when one job is distributed to three or more CPUs.

Figure 9:
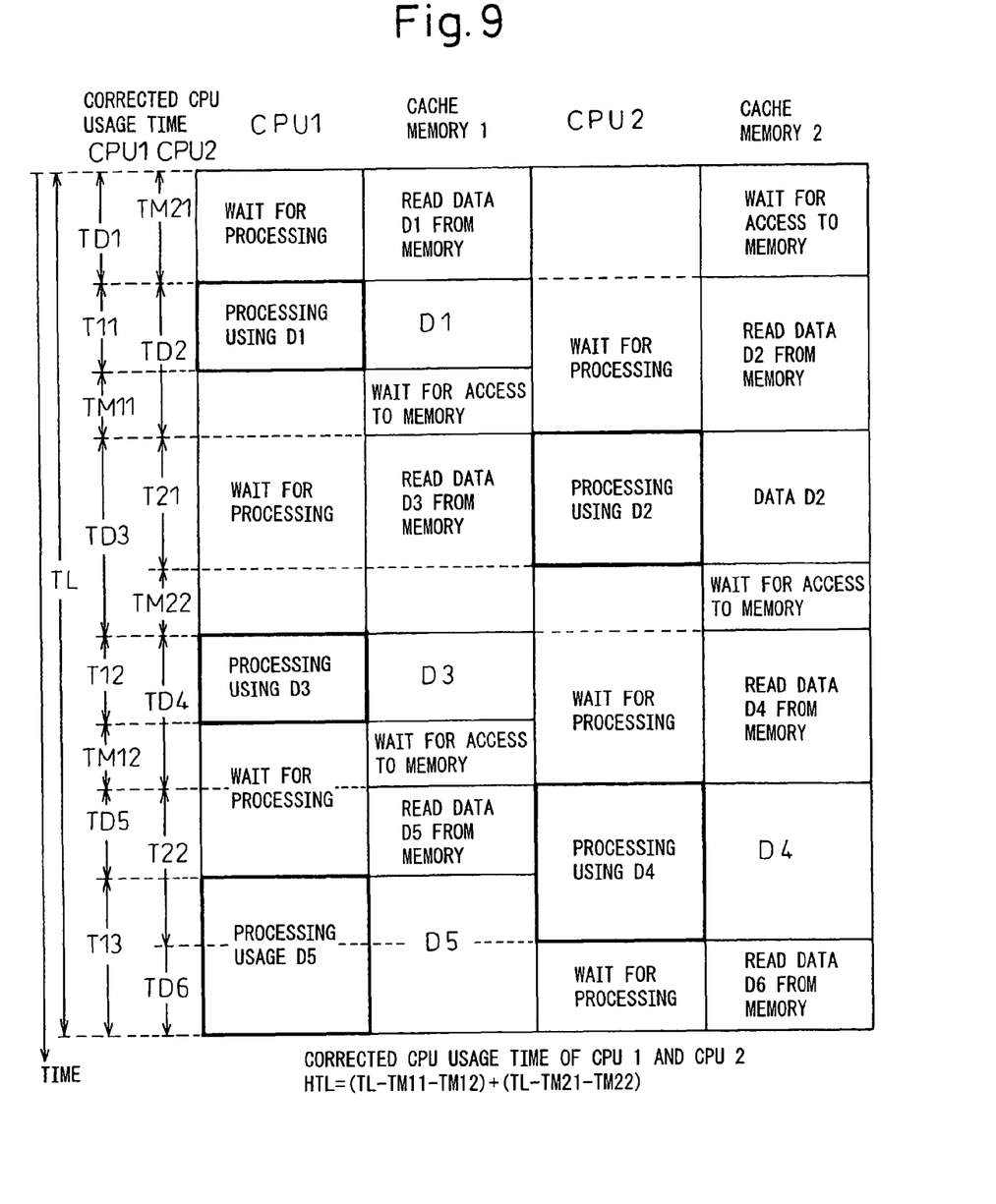
FIG. 9 is a timing chart for explaining the operation of the CPUs and the cache memories when one job is carried out by two CPUs.

FIG. 9 is a timing chart for explaining an embodiment of the operations of the CPU 1 and the CPU 2 and a cache memory 1 and a cache memory 2 provided in them when one job is executed by the two CPUs of the CPU 1 and the CPU 2 by sharing one memory.

In FIG. 9, an ordinate indicates the time and explains the corrected CPU times HTL of the CPU 1 and the CPU 2 of the present invention when both of the conventional CPU usage times of the CPU 1 and CPU 2 are TL.

As seen from this FIG. 9, in the time TD1 for the cache memory 1 to read the data D1 required for the processing by the CPU 1 from the memory (shared memory), the CPU 1 is in the processing waiting state and the cache memory 2 is waiting for access to the memory. Accordingly, the CPU 2 is also waiting for processing. The access wait time of the cache memory 2 to the memory is defined as TM21.

When the data D1 is read into the cache memory 1, the CPU 1 performs the processing using the data D1, and the cache memory 2 reads the data D2 required for the processing by the CPU 2. Accordingly, at this time, the CPU 2 is still in the processing waiting state. The read time of the data D2 of the cache memory 2 is defined as TD2, and the processing time of the CPU 1 using the data D1 is defined as T11.

When the CPU 1 finishes the processing using the data D1 stored in the cache memory 1, the cache memory 1 tries to read the data D3 required for the next processing by the CPU 1 from the memory. If at this time the read operation of the data D2 from the memory by the cache memory 2 has not ended, the cache memory 1 waits for access to the memory. At this time, the CPU 1 is in the processing waiting state. The access wait time of the cache memory 1 to the memory is defined as TM11.

When the read operation of the data D2 from the memory of the cache memory 2 has ended, the CPU 2 performs the processing using the data D2 stored in the cache memory 2. Then, the cache memory 1 reads the data D3 required for the next processing by the CPU 1 from the memory. The CPU 1 is in the processing waiting state. The processing time of the CPU 2 using the data D2 is defined as T21, while the read time of the data D3 by the cache memory 1 is defined as TD3.

When the CPU 2 finishes the processing using the data D2 stored in the cache memory 2, the cache memory 2 tries to read the data D4 required for the next processing by the CPU 2 from the memory. If at this time the read operation of the data D3 from the memory by the cache memory 1 has not ended, the cache memory 2 waits for access to the memory. At this time, both of the CPU 1 and the CPU 2 are in the processing waiting state. The access wait time to the memory of the cache memory 2 is defined as TM22.

When the read operation of the data D3 from the memory by the cache memory 1 has ended, the CPU 1 performs the processing using the data D3 stored in the cache memory 1. Then, the cache memory 2 reads the data D4 required for the next processing by the CPU 2 from the memory. The CPU 2 is in the processing waiting state. The processing time of the CPU 1 using the data D3 is defined as T12, while the read time of the data D4 by the cache memory 2 is defined as TD4.

When the CPU 1 ends the processing using the data D3 stored in the cache memory 1, the cache memory 1 tries to read the data D5 required for the next processing by the CPU 1 from the memory. If at this time the read operation of the data D4 from the memory by the cache memory 2 has not ended, the cache memory 1 waits for access to the memory. At this time, the CPU 1 is in the processing waiting state. The access wait time to the memory of the cache memory 1 is defined as TM12.

When the read operation of the data D4 from the memory by the cache memory 2 has ended, the CPU 2 performs the processing using the data D4 stored in the cache memory 2. Then, the cache memory 1 reads the data D5 required for the next processing by the CPU 1. The CPU 1 is in the processing waiting state. The processing time using the data D4 by the CPU 2 is defined as T22, while the read time of the data D5 by the cache memory 1 is defined as TD5.

When the read operation of the data D5 from the memory by the cache memory 1 has ended, the CPU 1 performs the processing using the data D5 stored in the cache memory 1. Then, when the processing by the CPU 2 using the data D4 stored in the cache memory 2 ends, the cache memory 2 reads the data D6 required for the next processing by the CPU 2 from the memory. The CPU 2 is in the processing waiting state. The processing time of the CPU 1 using the data D5 is defined as T13, while the read time of the data D6 by the cache memory 2 is defined as TD6.

In the operations of the CPU 1, cache memory 1, CPU 2, and cache memory 2 described above, the method of the present invention counts only the sum of the read time TD1 of the data D1 by the cache memory 1, the processing time T11 of the CPU 1 using the data D1, the read time TD2 of the data D2 by the cache memory 2, the processing time T21 by the CPU 2 using the data D2, the read time TD3 of the data D3 by the cache memory 1, the processing time T12 of the CPU 1 using the data D3, the read time TD4 of the data D4 by the cache memory 2, the processing time T22 of the CPU 2 using the data D4, the read time TD5 of the data D5 by the cache memory 1, and the processing time T13 of the CPU 1 using the data D5 in the corrected CPU usage time of the CPU 1 and the CPU 2.

In other words, the corrected CPU usage time HTL of the CPU 1 and the CPU 2 of the present invention is the time obtained by subtracting the access wait times to the memories by the cache memories from the conventional CPU usage times TL of the CPU 1 and the CPU 2 and can be represented by the following equation:

$$HTL=(TL-TM11-TM12)+(TL-TM21-TM22)$$

In this way, in the CPU usage time counting method of the present invention, the memory access wait time of a cache memory is not counted in the usage time of a CPU, therefore a corrected CPU usage time which becomes the same CPU usage time every time in the case of the same program can be calculated.

INDUSTRIAL APPLICABILITY

According to the CPU usage time counting method and the job control system using this CPU usage time shown in the present invention, it is possible to compute the actual CPU usage time and thereby find the same corrected CPU usage time every time by processing when processing the same program, correctly predict the ending time of a certain job, predict the performance of a CPU in an environment where a plurality of jobs are executed, and provide stable service even for charging for the CPU usage time. Due to this, it becomes possible to charge a user requesting a job using the computer for the constantly correct CPU usage time.

The invention claimed is:

1. A CPU usage time counting method for counting an actual usage time of each CPU in a computer system which includes a display device and a recording device and executes distributed processing of each of a plurality of jobs input to an integration network, to which a plurality of CPUs and at least one memory are connected, by using said CPU and the memory, comprising:
   counting a CPU usage time, provided in basic software of said computer system, used for each job, and storing a counted result in said memory;
   counting a memory access wait time, obtained by subtracting a memory access time of a highest speed job in hardware design of the computer system from the memory access time of a job executing in a CPU, including the processing wait time of the CPU, when each CPU accesses the at least one memory via the integration network during execution of each job;
   setting a corrected CPU usage time, calculated by subtracting said memory access wait time of each CPU from the CPU usage time for each job, as an actual CPU usage time; and
   outputting a display output and a recording output of said corrected CPU usage time to the display device and the recording device according to a request from a corresponding job.

2. A CPU usage time counting method as set forth in claim 1, wherein a display device and a recording device are provided in said computer system, and
   wherein a display output and a recording output of said corrected CPU usage time are output to said display device and said recording device according to a request from said corresponding job.

3. A job control system for counting an actual usage time of each CPU in a computer system which includes a display device and a recording device and executes distributed processing of jobs, input to an integration network, to which a plurality of CPUs and at least one memory are connected, by using said CPU and the memory, and controlling the jobs by this actual usage time, comprising:
   counting means for counting a memory access wait time, obtained by subtracting a memory access time of a highest speed job in hardware design of the computer system from the memory access time of a job executing in a CPU, including the processing wait time of the CPU, when each CPU accesses the memory via the integration network during execution of each job and storing a counted result in said memory;

corrected CPU usage time calculating means for calculating a corrected CPU usage time by subtracting the memory access wait time of each CPU from a CPU usage time for each job provided in basic software of said computer system;

outputting means for outputting a display output and a recording output of said corrected CPU usage time to the display device and the recording device according to a request from a corresponding job; and job controlling means for using said corrected CPU usage time to control a job.

4. A job control system as set forth in claim 3, wherein a memory of said job control system is provided inside it with a CPU time management structure for storing said CPU usage time and storing said corrected CPU usage time.

5. A job control system as set forth in claim 4, wherein said CPU time management structure is further provided with an area for storing a CPU time limit.

6. A job control system as set forth in claim 5, wherein said job controlling means compares said corrected CPU usage time calculated during the execution of a job with a CPU time limit stored in said CPU time management structure and stops the job when the set value of said actual CPU usage time becomes said CPU time limit or more.

7. A job control system as set forth in claim 6, wherein said job controlling means notifies said corrected CPU usage time calculated during the execution of a job to said job in real time according to a request from the job.

8. A job control system as set forth in claim 7, wherein said job controlling means has a data output terminal for outputting said corrected CPU usage time calculated during the execution of said job to the outside connected to it.

9. A job control system as set forth in claim 8, wherein said job control system is provided with a display device connected to said data output terminal.

10. A job control system as set forth in claim 9, wherein a data recording means for recording said corrected CPU usage time calculated during the execution of said job is connected to said job controlling means.

11. A job control system as set forth in claim 3, wherein said job controlling means notifies said corrected CPU usage time calculated during the execution of a job to said job in real time according to a request from the job.

12. A job control system as set forth in claim 3, wherein said job controlling means has a data output terminal for outputting said corrected CPU usage time calculated during the execution of said job to the outside connected to it.

13. A job control system as set forth in claim 12, wherein said job control system is provided with a display device connected to said data output terminal.

14. A job control system as set forth in claim 3, wherein a data recording means for recording said corrected CPU usage time calculated during the execution of said job is connected to said job controlling means.

* * * * *